United States Patent [19]

Boag

[11] Patent Number: 5,489,116
[45] Date of Patent: Feb. 6, 1996

[54] AIR BAG MOUNTING ASSEMBLY

[75] Inventor: John Boag, Ferndale, Mich.

[73] Assignee: Ford Motor Company, Dearborn, Mich.

[21] Appl. No.: 363,791

[22] Filed: Dec. 27, 1994

[51] Int. Cl.⁶ ............................ B60R 21/20; B60R 21/22
[52] U.S. Cl. ........................ 280/728.2; 280/732
[58] Field of Search ................ 280/728 A, 732, 280/752, 730 R, 728 R, 728.2, 730.1, 728.1; 296/70; 180/90

[56] References Cited

U.S. PATENT DOCUMENTS

| | | |
|---|---|---|
| 3,514,125 | 5/1970 | Nemecek . |
| 3,794,346 | 2/1974 | Brockman et al. . |
| 3,794,347 | 2/1974 | Zens . |
| 3,836,167 | 9/1974 | Wilson . |
| 4,153,273 | 5/1979 | Risko . |
| 4,191,392 | 3/1980 | Barnett . |
| 4,332,398 | 6/1982 | Smith . |
| 4,915,410 | 4/1990 | Bachelder . |
| 5,135,252 | 8/1992 | Suran et al. ............ 280/728 A |
| 5,145,207 | 9/1992 | Baderka et al. ............ 280/728 A |
| 5,230,530 | 7/1993 | Iriyama et al. ............ 280/732 |

FOREIGN PATENT DOCUMENTS 0197450  8/1990  Japan ................ 280/730 R

*Primary Examiner*—Brian L. Johnson
*Assistant Examiner*—Peter C. English
*Attorney, Agent, or Firm*—Daniel M. Stock; Roger L. May

[57] ABSTRACT

A mounting assembly is provided for mounting an air bag module (38) in the instrument panel (10) of an automotive vehicle, which includes a box-like tray member (74) secured to the instrument panel (10) and to the vehicle body (14) that receives an air bag module in snap-fit relationship upon insertion of the air bag module through an aperture (24) in the instrument panel.

16 Claims, 3 Drawing Sheets

AIR BAG MOUNTING ASSEMBLY

BACKGROUND OF THE INVENTION

1. Field of the Invention

The present invention relates generally to automotive inflatable occupant restraint systems, and more specifically to structures and methods for mounting inflatable occupant restraint devices within automotive vehicles.

2. Description of the Related Art

To reduce costs and increase reliability in the assembly of inflatable occupant restraint devices in automotive vehicles, it is desirable to simplify the assembly method and apparatus to optimal levels. It has been the predominant practice in the prior art with respect to the assembly of the type of cylindrical air bag modules generally utilized on the passenger side of automotive vehicles to provide a mounting plate of some type that is secured to a plurality of fasteners for effecting attachment to the instrument panel of the vehicle. U.S. Pat. No. 4,915,410 is exemplary of the type of automotive vehicle air bag modules in common use in the automotive industry today. This is disadvantageous from the standpoint of cost, weight, and complexity.

Much final assembly of automotive vehicles is effected with robotic devices and assembly aids. Prior art devices and assembly techniques do not present opportunities for improving assembly processes owing to their dependence upon the use of multiple fasteners for attachment.

SUMMARY OF THE INVENTION

In response to the deficiencies in the prior art, the present invention provides a mounting assembly for an air bag system for fixedly securing the air bag module to the instrument panel of a vehicle. The mounting assembly includes structure defining an aperture through the instrument panel to receive the air bag module, a box-like tray member carried adjacent the aperture and a mechanism for receiving the air bag module in snap-fit retention with respect to the tray upon insertion through the aperture in the instrument panel.

The invention construction advantageously permits simple final assembly of the air bag module with respect to the instrument panel by direct longitudinal insertion into the aperture followed by a simple fastening of the air bag module to a portion of the vehicle body when in the snap-fit retained position.

BRIEF DESCRIPTION OF THE DRAWINGS

Other objects, features, and advantages of the present invention will be apparent to those skilled in the automotive vehicle occupant restraint arts upon reading the following description with reference to the accompanying drawings, in which.

DESCRIPTION OF THE PREFERRED EMBODIMENT(S)

Figure 1:
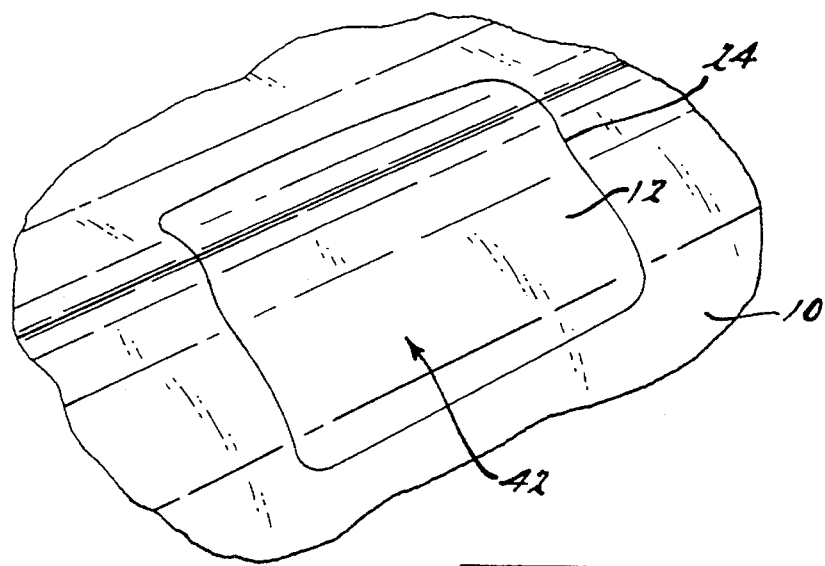
FIG. 1 is a perspective view of a portion of an automotive vehicle instrument panel having an air bag module installed therein.

Turning now to FIG. 1, an automotive vehicle instrument panel 10 is illustrated as having an inflatable occupant restraint assembly 12 installed in it. The instrument panel 10, as is well known in the art, extends laterally across an automotive vehicle (not shown). As may best be seen in FIGS. 2–5, a laterally extending cross-car beam 14 is positioned adjacent the instrument panel 10 and extends in a direction generally parallel to the lateral extent of the instrument panel 10. A mounting assembly, indicated generally at 16, is operatively connected between the instrument panel 10, the inflatable occupant restraint assembly 12, and the cross-car beam 14. It is well understood by those skilled in the automotive vehicle body arts that the cross-car beam 14 is preferably fixedly secured in a suitable manner to a structural portion of the vehicle body.

Figure 2:
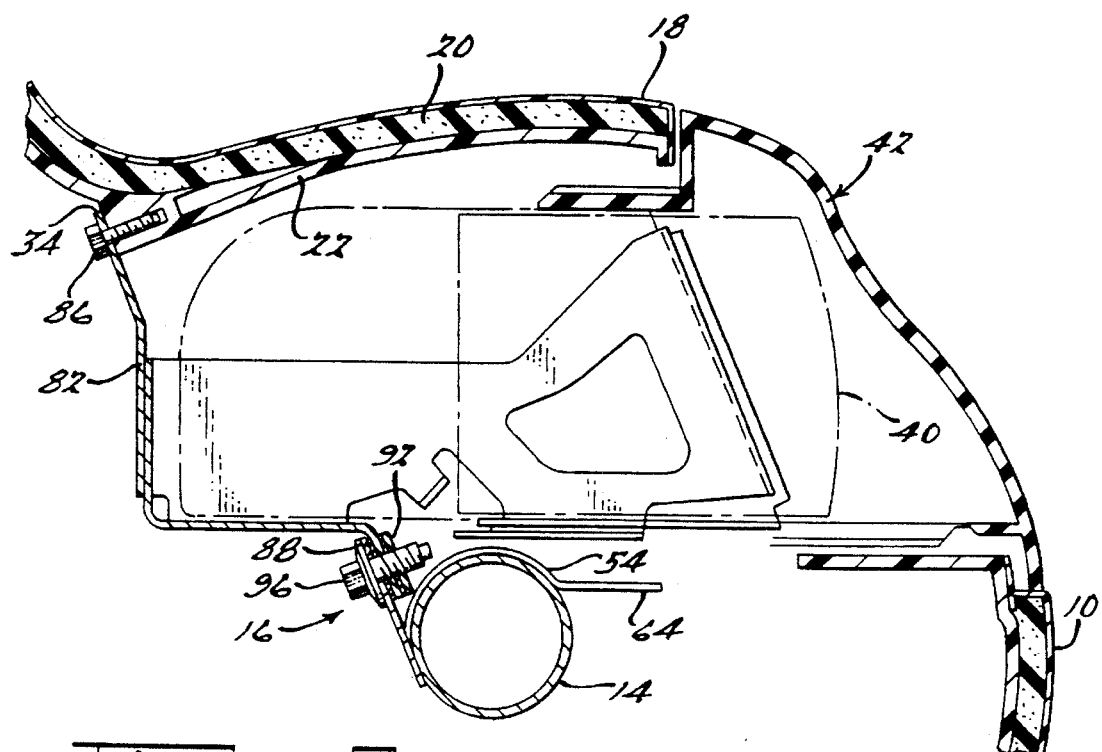
FIG. 2 is a cross-sectional view of the instrument panel of FIG. 1 at one lateral position in the vehicle illustrating attachment of the tray member of the present invention to the vehicle body.
Figure 5:
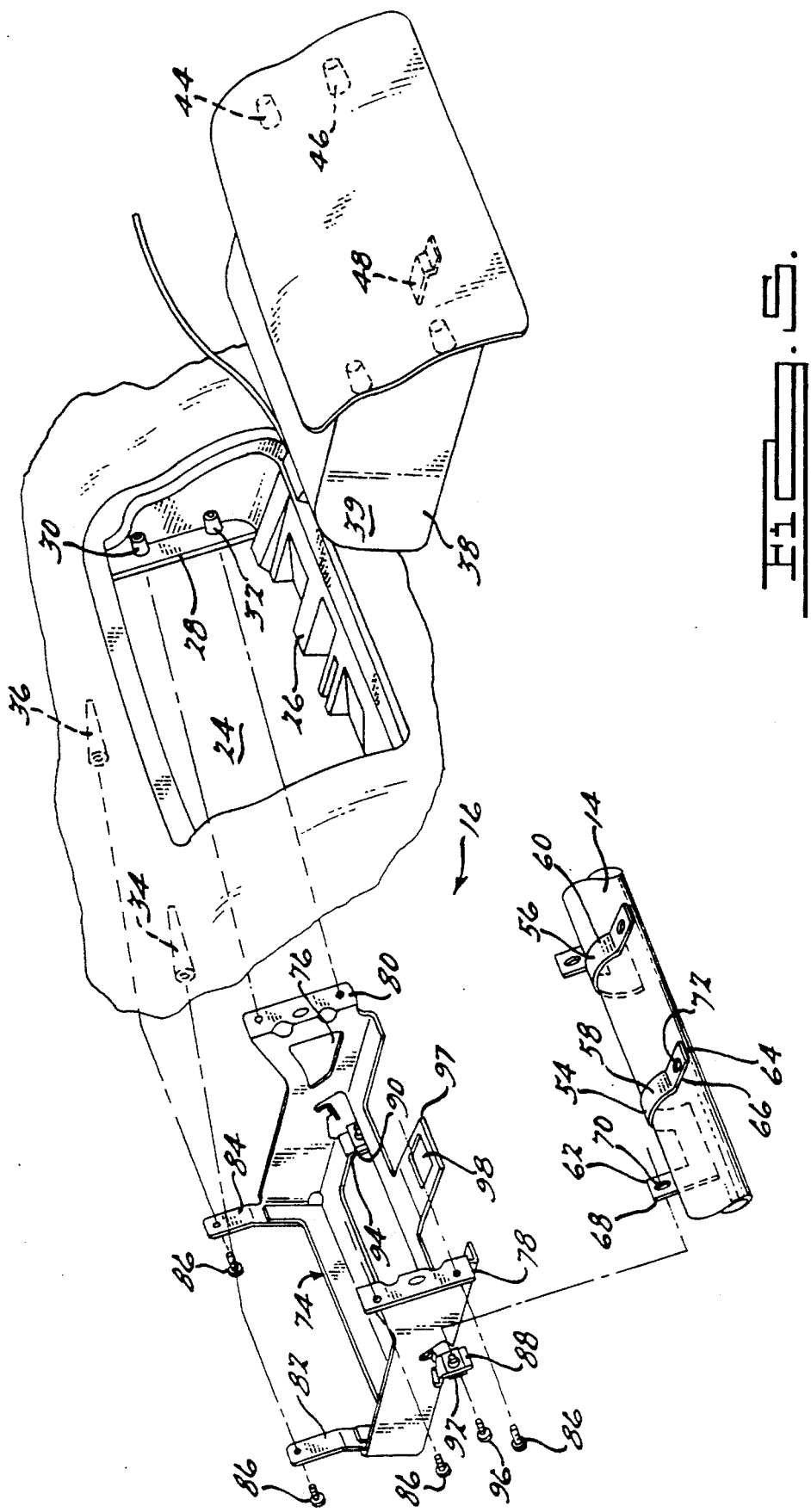
FIG. 5 is an exploded perspective view illustrating the assembly of an air bag module under the instrument panel of a vehicle.

Turning now to FIGS. 2 and 5, the instrument panel 10 is illustrated as a layered plastic structure, as best shown in FIG. 2, including an outer skin portion 18, an intermediate body portion 20, and an inner attachment portion 22.

A generally rectangular aperture 24, as may best be seen in FIG. 5, is formed through the instrument panel 10. A plurality of mounting surfaces surround the aperture 24, including lower shelf surface 26 and a pair of laterally spaced attachment ledges 28 (one shown) which include upper and lower fastener bosses 30, 32. Attachment bosses 34, 36 are formed in attaching portion 22 of the instrument panel 10, as indicated in FIG. 2 and in an exploded fashion in FIG. 5.

The inflatable occupant restraint assembly 12 is illustrated diagrammatically in the drawings. For purposes of understanding the present invention, it is important only to appreciate that the inflatable occupant restraint assembly 12 preferably is of the type having a generally box-like air bag module 38, which is configured to contain a fabric air bag in an undeployed state in fluid communication with a gas generant, or stored gas source, for inflating the bag through an outer end such as indicated at 40 in FIG. 2. A plastic trim cover 42 is placed over the end 40 of the air bag module 38 and is configured to register with the aperture 24 in the instrument panel 10 and to be arranged with it in coplanar relationship, as indicated in the FIGS.

The air bag cover 42 includes upper and lower receiver means 44, 46, as shown in FIG. 2, for receiving the fastener projections 30, 32 of the instrument panel 10 in slip-fit relationship to accurately locate the air bag cover 42 and hence the air bag module 38 with respect to the aperture 24, it being understood that the air bag cover 42 is fixedly secured in known fashion to the air bag module 38.

Figure 4:
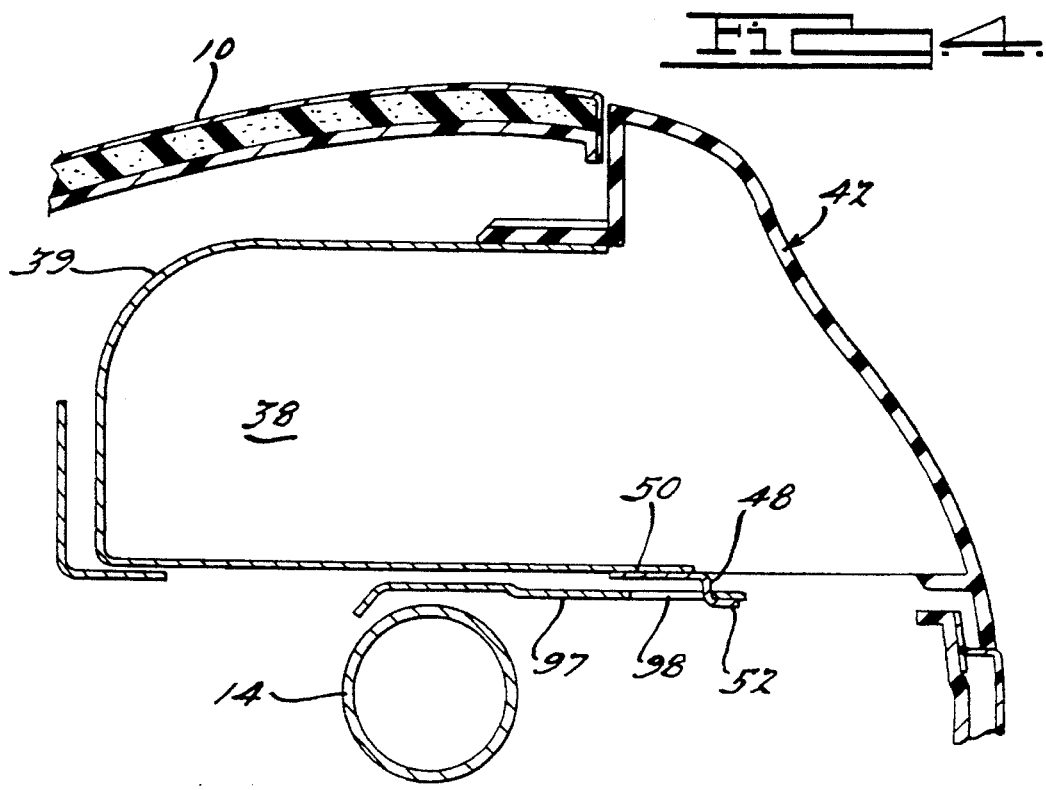
FIG. 4 is another cross-sectional view taken at another lateral position illustrating snap-fit relationship between the air bag module and the tray of the present invention.

The air bag module 38 necessarily includes a box-like, preferably metallic, housing 39, as may best be seen in FIG. 4, for containing the air bag and gas producing device (not shown).

As may best be seen in FIG. 5, the mounting assembly 16 is illustrated as having a tongue member 48 fixedly secured to the housing 39 of the air bag module 38 as by welding.

The tongue member 48 is preferably fabricated to include a flat attaching arm 50 and a depending hook portion 52.

The mounting assembly 16 is further illustrated as including a pair of laterally spaced resilient strap members 54, 56, which include loop portions 58, 60, respectively, through which they are fixedly secured as by welding to the cross-car beam 14. Each strap member 54, 56 includes longitudinally spaced mounting arms 62, 64, which terminate in mounting flanges 66, 68 having fastener apertures 70, 72 formed therethrough for effecting attachment to adjacent components to be herein described.

The mounting assembly 16 still further includes a generally box-like tray member 74 having an open face 76 that is arranged in registration with the aperture 24 of the instrument panel 10. The tray member 74 includes front mounting flanges 78, 80 and rear mounting flanges 82, 84, which abuttingly engage complementary surfaces of the instrument panel 10 for attachment thereto. Threaded fasteners, such as screws 86, are preferably utilized for securing the tray member 74 to the instrument panel 10.

A pair of attaching ears 88, 90 depend from the bottom of the tray member 74 and receive clip nuts 92 for receiving threaded fasteners, such as screw 96, for fastening the ears 88, 90 to the rear mounting flanges 68 of the strap members 54, 56.

Figure 3:
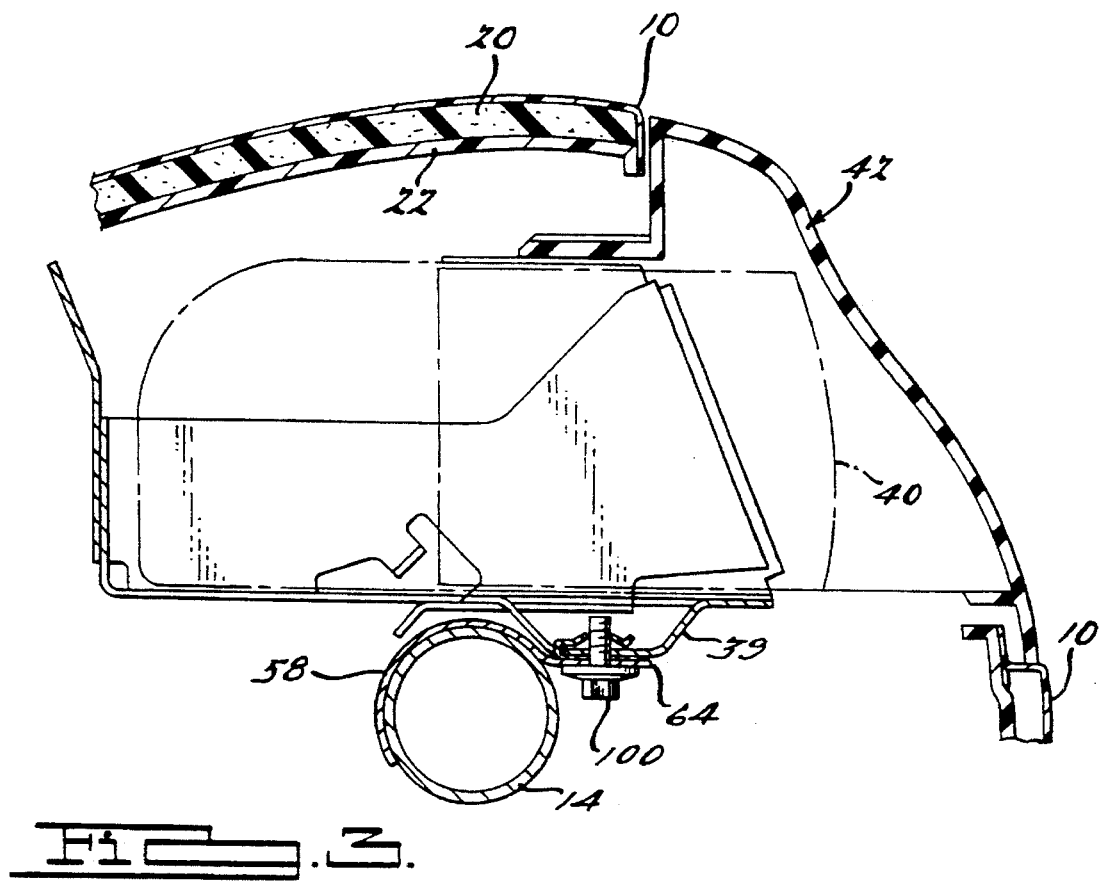
FIG. 3 is another cross-sectional view similar to FIG. 2 at a different lateral position illustrating securement of the air bag module to the vehicle body.

A bottom panel 94 of the tray member 74 includes a forwardly projecting tab portion 97 through which is formed an aperture 98 into which the hook portion 52 of the tongue member 48 is received in snap-fit relationship when the air bag module 38 is inserted into the tray member 74 to the position shown in FIGS. 2–4. When in this assembled position, a portion 39 of the housing 44 of the air bag module 38 is fastened to the front mounting flanges 68, 66 of strap members 54, 56 by means of a threaded fastener such as a screw 100, as illustrated in FIG. 3. In its final assembled position, the air bag module 38 is received in snap-fit relationship with respect to the instrument panel 10 through agency of the tongue 48 and the tab 97 with accurate positioning being achieved by interaction of the projections 30, 32 and the receivers 44, 46. Final securement is effected through the screws 100 joining the air bag module 38 to the straps 54, 56. Since the straps 54, 56 are fixedly secured to the cross-car beam 14, the air bag module 38 is fixedly but resiliently mounted with respect to the vehicle body, and the tray member 74, otherwise supporting the air bag module, is likewise mounted to the cross-car beam 14 through the interaction of the depending ears 88, 90 with the rear mounting flanges 68 of the straps 54, 56.

This construction permits an efficient assembly of the inflatable occupant restraint system 12 with respect to the instrument panel 10 by permitting insertion of the air bag module 38 through the aperture 24 and the instrument panel 10 to a position in which the snap-fit engagement is effected followed by a fixed securement of the air bag module to the body through agency of the cross-car beam.

Only one embodiment of the inventive mounting arrangement for inflatable occupant restraint system and a single method for assembling the inflatable occupant restraint system using the inventive mounting arrangement as shown. Others may occur to those skilled in the automotive vehicle occupant restraint arts that do not depart from the scope of the following claims.

What is claimed is:

1. In an automotive vehicle having a body structure including a laterally extending beam carried therein and instrument panel carried within the body structure and an air bag module carried with the instrument panel and operatively associated with the automotive vehicle for inflatably restraining a vehicle occupant, a mounting assembly for fixedly securing said air bag module within the instrument panel, comprising:

means defining a generally rectangular aperture through said instrument panel sized to receive said air bag module;

a generally box-like tray member fixedly secured to the body structure laterally extending beam and the instrument panel and having one open face arranged in juxtaposition with said aperture; and snap-fit retention means operatively disposed between said air bag module and said tray member to effect snap-fit retention upon insertion of said air bag module into said instrument panel aperture.

2. A mounting assembly as defined in claim 1, said snap-fit retention means comprising a resilient tongue member secured to said air bag module and depending from a lower side thereof and engaging a retaining portion of said tray member upon insertion of said air bag module into said instrument panel aperture.

3. A mounting assembly as defined in claim 2, said tray member retaining portions comprising a retaining tab having an aperture formed therethrough carried with said tray member and receiving said tongue member in snap-fit relationship upon insertion of said air bag module into said instrument panel aperture.

4. A mounting assembly as defined in claim 1, wherein said air bag module is fixedly secured to said beam.

5. A mounting assembly as defined in claim 1, wherein said tray member and said air bag module are both fixedly secured to said body structure laterally extending beam.

6. A mounting assembly as defined in claim 5, and further comprising at least one strap member fixedly secured to said beam and having a pair of longitudinally spaced attaching portions operative to effect securement of said tray member and said air bag module to said strap member.

7. A mounting assembly as defined in claim 6, wherein said at least one strap member comprises two strap members.

8. A method of assembling an air bag module into the instrument panel of an automotive vehicle of the type having a body structure including a laterally extending beam positioned near the instrument panel, the method comprising the steps of:

forming an aperture through the instrument panel;

securing a box-like tray to the instrument panel and to the beam;

inserting an air bag module through said aperture; and engaging said air bag module with said tray in snap-fit relationship.

9. The method as defined in claim 8, and further comprising fixedly securing said air bag module to said beam after said inserting step.

10. An automotive inflatable occupant restraint system for an automotive vehicle having a body including a laterally extending beam operatively carried in said body, the occupant restraint system comprising:

an instrument panel mounted within the body;

an air bag module fixedly secured to said body; and means defining a generally rectangular aperture through said instrument panel sized to receive said air bag module;

a generally box-like tray member fixedly secured to the beam and the instrument panel and having one opened face arranged in juxtaposition with said aperture; and snap-fit retention means operatively disposed between said air bag module and said tray member to effect snap-fit retention upon insertion elf said air bag module into said instrument panel aperture.

11. An occupant restraint system as defined in claim 10, and further comprising means for fixedly securing said air bag module to said body upon said tray member receiving said air bag module in snap-fit relationship.

12. An occupant restraint system as defined in claim 10, said snap-fit retention means comprising a resilient tongue member secured to said air bag module and depending from a lower side thereof and engaging a retaining portion of said tray member upon insertion of said air bag module into said instrument panel aperture.

13. An occupant restraint system as defined in claim 12, said tray member retaining portion comprising a retaining tab having an aperture formed therethrough carried with said tray member and receiving said tongue member in snap-fit relationship upon insertion said air bag module into said instrument panel aperture.

14. An occupant restraint system as defined in claim 10, wherein said air bag module is fixedly secured to said beam.

15. An occupant restraint system as defined in claim 14, and further comprising at least one strap member fixedly secured to said beam and having a pair of longitudinally spaced attaching portions operative to effect securement of said tray member and said air bag module to said strap member.

16. An occupant restraint system as defined in claim 15, wherein said at least one strap member comprises two strap members.

* * * * *